United States Patent [19]

Kinsinger

[11] Patent Number: 6,091,175
[45] Date of Patent: Jul. 18, 2000

[54] SELF-CENTERING ROTOR BEARING ASSEMBLY FOR SUBMERSIBLE PUMP MOTORS

[75] Inventor: Griff H. Kinsinger, Bartlesville, Okla.

[73] Assignee: Camco International, Inc., Houston, Tex.

[21] Appl. No.: 09/042,346

[22] Filed: Mar. 12, 1998

[51] Int. Cl.$^7$ .............................. H02K 5/16; F04D 13/08
[52] U.S. Cl. ................... 310/90; 310/87; 310/91; 384/119; 384/215; 384/218; 384/219; 277/647; 277/555; 277/530; 277/438; 417/365; 417/423.3; 417/424.1
[58] Field of Search ................... 310/90, 91, 87; 384/119, 215, 97, 218, 219; 277/647, 555, 530, 554, 438; 417/365, 423.3, 424.1

[56] References Cited

U.S. PATENT DOCUMENTS

| | | | |
|---|---|---|---|
| 3,467,451 | 9/1969 | Marley | 308/26 |
| 3,485,538 | 12/1969 | Nogle et al. | 308/9 |
| 3,663,847 | 5/1972 | Schaefer | 310/90 |
| 3,897,983 | 8/1975 | Hindle | 308/26 |
| 3,974,406 | 8/1976 | Wehde | 310/67 R |
| 4,119,874 | 10/1978 | Beavers et al. | 310/90 |
| 4,280,741 | 7/1981 | Stoll | 308/3.5 |
| 4,329,122 | 5/1982 | Owada et al. | 417/365 |
| 4,435,661 | 3/1984 | Witten | 310/90 |
| 4,453,099 | 6/1984 | Flat | 310/87 |
| 4,513,215 | 4/1985 | Del Serra | 310/90 |
| 4,521,708 | 6/1985 | Vandevier | 310/87 |
| 4,623,810 | 11/1986 | Smith | 310/90 |
| 4,638,198 | 1/1987 | Cochran | 310/87 |
| 4,890,937 | 1/1990 | Balsells | 384/16 |
| 4,893,795 | 1/1990 | Balsells | 267/1.5 |
| 5,003,210 | 3/1991 | Liu et al. | 310/87 |
| 5,128,573 | 7/1992 | Liu et al. | 310/87 |
| 5,189,328 | 2/1993 | Knox | 310/90 |
| 5,209,577 | 5/1993 | Swatek | 384/97 |
| 5,265,890 | 11/1993 | Balsells | 277/163 |
| 5,452,957 | 9/1995 | Duggan | 384/99 |
| 5,559,383 | 9/1996 | Ide | 310/90 |

FOREIGN PATENT DOCUMENTS

| | | | |
|---|---|---|---|
| 0 359 053 | 3/1990 | European Pat. Off. | F16C 27/02 |
| 2120740A | 12/1983 | United Kingdom | F16C 27/06 |

*Primary Examiner*—Nestor Ramirez
*Assistant Examiner*—Tran N Nguyen
*Attorney, Agent, or Firm*—Fletcher, Yoder, & Van Someren

[57] ABSTRACT

The invention provides a submersible pumping system which includes a motor containing self-centering rotor bearing assemblies. Each rotor bearing assembly in accordance with the present invention includes a sleeve, a journal, and at least two seals. The journal is preferably disposed about the sleeve which is keyed to the power transmission shaft of the motor. The journal has a peripheral surface which is configured to have at least two circumferential support regions which are spaced apart from one another. Each of these circumferential support regions supports a corresponding seal. Each seal includes an interface member and an activating member. When in place in a rotor section of a submersible pump motor, the seals frictionally engage the inner surface of the stator and exert a centering force against the journal and thus against the bearing sleeve and the power transmission shaft. The seals also exert a force against the inner surface of the stator which prevents rotation of the journal when the power transmission shaft is rotating.

34 Claims, 5 Drawing Sheets

SELF-CENTERING ROTOR BEARING ASSEMBLY FOR SUBMERSIBLE PUMP MOTORS

BACKGROUND OF THE INVENTION

1. Field of the Invention

This invention relates generally to submersible pump motors, and in particular to the rotor bearings used therein.

2. Discussion of the Related Art

Submersible pumping systems have been employed in the pumping of oil and water from wells for many years. Typically, a submersible pumping system comprises an electric motor, a motor protector, and a pump suspended colinearly in a well casing by tubing or cable. The pump is generally a centrifugal pump which is coupled to the motor. The motor rotates a power transmission shaft that concurrently operates the pump. The motor and motor protector are filled with oil to aid in heat dissipation, to maintain proper internal lubrication of the motor, and to separate the internal components of the motor from surrounding wellbore fluids.

Because these pumping systems are generally disposed within a narrow well casing, the motor, motor protector, and pump are generally long and cylindrically shaped. The motors vary in horsepower depending on the application. Accordingly, the motors of submersible pumping systems can be quite long leading to particular difficulties not encountered in other electric motor applications.

The motors of submersible pumping systems are typically comprised of a stator secured within a tubular housing and a rotor secured to a power transmission shaft that rotates within the stator. The rotor typically is made up of a number of rotor sections, the number of rotor sections depending upon the length and power rating of the motor. Generally, each rotor section is comprised of laminated steel plates or disks secured by copper rods. The rotor sections are spaced apart from each other, and a rotor bearing assembly is located between each rotor section. Each rotor section is keyed to the shaft so that all of the rotor sections rotate as the shaft does.

Each rotor bearing assembly within a rotor section acts to support the shaft and to maintain it in proper axial alignment. A rotor bearing assembly is generally comprised of a sleeve keyed to the shaft so that the sleeve rotates as the shaft does, and a journal or bearing, disposed coaxially around the sleeve. The sleeve and journal are rotatively coupled to one another. The journal is configured to frictionally engage the inner wall of the stator to prevent the bearing from rotating and to maintain proper alignment of the shaft. Thus, a portion of the rotor bearing assembly is rigidly coupled to the shaft but not to the stator.

Due to the high operating temperatures within the well, thermal expansion tends to cause the shaft, rotor, and stator to grow axially. Generally, the rotor and shaft tend to grow axially downwards during high temperature operation. The stator also tends to grow axially downwards, however, to a lesser extent than the rotor and the shaft. Due to these thermal expansion effects, the motor is constructed so that each rotor bearing assembly attached to the motor shaft within a rotor section offers a limited amount of axial mobility. Thus, because each rotor bearing assembly is coupled to the motor shaft, the shaft retains the same limited amount of axial mobility. Axial mobility is limited by thrust washers adjacent to each rotor bearing assembly.

Angular misalignment of the shaft within the motor can occur because the rotor, shaft, and stator are subject to these dimensional changes due to thermal expansion and because of imbalances in the rotating assembly. Misalignment of the shaft during operation opposes the centering, or aligning force of the bearing assembly and causes vibrations within the motor. Excess vibration can lead to premature motor or component failure.

Ideally, the journal will remain stationary while the sleeve, rotor, and shaft are rotating. Previously, rotor bearing assemblies have been used in which the peripheral surface of the journal frictionally engages the inner surface of the stator through metal-to-metal contact, such as via a metallic washer. Such metal-to-metal frictional fit rotor bearing assemblies have a tendency to become loose and then to rotate with the shaft. Rotation of the journal tends to gouge and deface the inner surface of the stator. Once the journal begins to rotate with the shaft, the centering force of the rotor bearing assembly is diminished leading to increasing angular misalignment, vibration, and motor failure. This type of construction is also unsatisfactory because due to thermal expansion of the bearing assembly during motor operation, the journal may tightly engage the stator wall which can cause angular misalignment of the shaft and thus excessive thrust loads onto the thrust bearing surfaces adjacent to the rotor bearing assembly.

Various types of elastomeric materials have been interposed between the journal and the inner surface of the stator in an effort to hold the journal stationary while also allowing the necessary axial mobility of the journal vis-a-vis the inner surface of the stator. These elastomeric materials have been in the form of O-rings or other similarly configured and annularly disposed means. While initially operating satisfactorily, the elastomeric materials tend to lose their elastic memory due to the effects of thermal expansion and contraction during periods of operation followed by inactivity. With the loss of the elastic memory of the elastomeric material, the bearing becomes loose and rotatable. Once the journal begins to rotate with the shaft, the centering force of the rotor bearing assembly is diminished leading to increasing angular misalignment, vibration, and motor failure. Such elastomeric elements also render the motor more difficult to assemble, and may be easily damaged by adjacent metal parts during assembly of the rotating assembly and stator.

SUMMARY OF THE INVENTION

The self-centering rotor bearing assembly of the present invention overcomes the deficiencies of previous rotor bearing assemblies. The rotor bearing assembly of the present invention maintains a consistent centering force on the motor shaft while at the same time effectively resisting rotation. Thus, the present invention increases the life expectancy of a submersible pumping system, and more particularly the motor component of that system, through the reduction of damaging vibration as a result of angular misalignment of the shaft.

The present invention provides a submersible pumping system which is particularly well suited for use in a subterranean well environment. The pumping assembly will typically include a pump, a motor, and a motor protector. Other equipment may also be provided, such as fluid separators, injection pumps, instrumentation, and so forth. The motor component of the system includes a non-rotating group including, for example, a motor stator. The motor includes a rotating group which includes a power transmission shaft, a motor rotor, and the sleeve portion of a rotor bearing assembly. The rotor bearing assembly of the present invention includes a sleeve, a journal, and at least two seals.

The journal is preferably disposed about the sleeve which is keyed to the power transmission shaft of the motor. The journal has a peripheral surface which is configured to have at least two circumferential support regions which are spaced apart from one another. Each of these circumferential support regions supports a corresponding seal. Each seal includes an interface member and an activating member. When in place in a rotor section of a submersible pump motor, the seals frictionally engage the inner surface of the stator and exert a centering force against the journal and thus against the bearing sleeve and the power transmission shaft. The seals also exert a force against the inner surface of the stator which prevents rotation of the journal when the power transmission shaft is rotating.

In accordance with another aspect of the invention, a submersible pump motor is provided which includes a rotating group and a non-rotating group. The non-rotating group preferably includes a self-centering rotor bearing assembly which includes a journal configured to be disposed around a rotating member of the motor. That rotating member is preferably a sleeve coupled to the power transmission shaft. The journal has a peripheral surface configured to possess at least two circumferential support regions spaced apart from one another. Each circumferential support region supports a corresponding seal. Each seal includes an interface member and an activating member. When the self-centering rotor bearing assembly is affixed to the power transmission shaft of the submersible pump motor and installed within a rotor section within the motor, each seal provides a centering force against the journal and thus against the bearing sleeve and the power transmission shaft. The seals create a centering force by the compression of the seal between the inner surface of the stator and the support regions of the journal. The force against the inner surface of the stator is sufficient to prevent the rotation of the journal when the power transmission shaft rotates in operation.

BRIEF DESCRIPTION OF THE DRAWINGS

The foregoing and other advantages and features of the invention will become apparent upon reading the following detailed description and upon reference to the drawings in which.

DESCRIPTION OF SPECIFIC EMBODIMENTS

Figure 1:
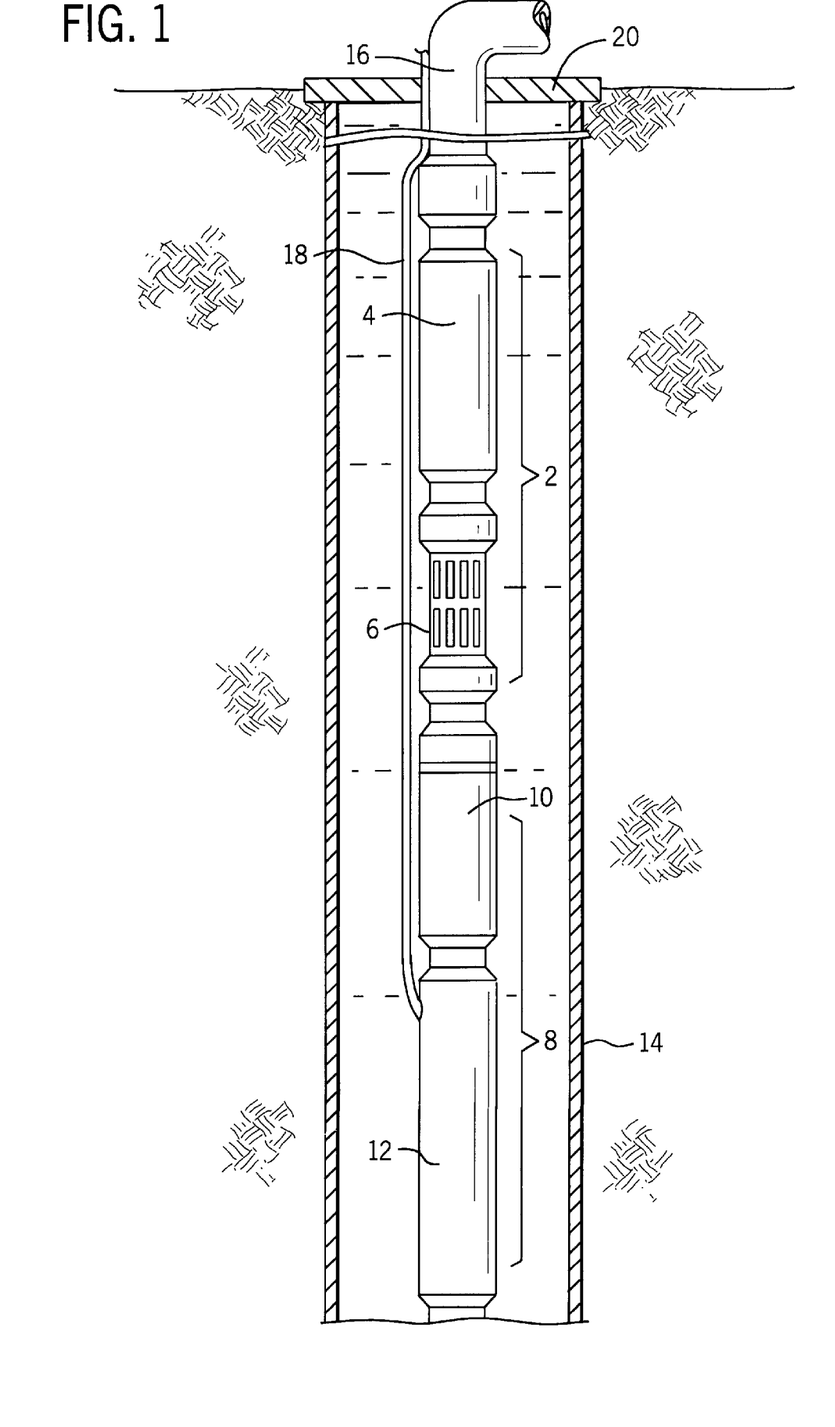
FIG. 1 is a vertical elevational view of an exemplary submersible pumping system including a motor, motor protector, and pump.

Referring to FIG. 1, a submersible pumping system is depicted as including a pump module and a motor module. Pump module 2 is comprised of a pump 4 and an inducer or intake section 6 for the pump. Motor module 8 is comprised of a motor protector 10 and a motor 12. The pump module and the motor module are coupled to one another and disposed colinearly within the well casing 14 and suspended at an appropriate position within well casing 14 by tubing 16. Electrical power is provided to the motor by means of a power cable 18. The fluid of interest to be pumped from the well by means of the submersible pumping system is produced to the surface through tubing 16 and through well head 20.

Figure 2:
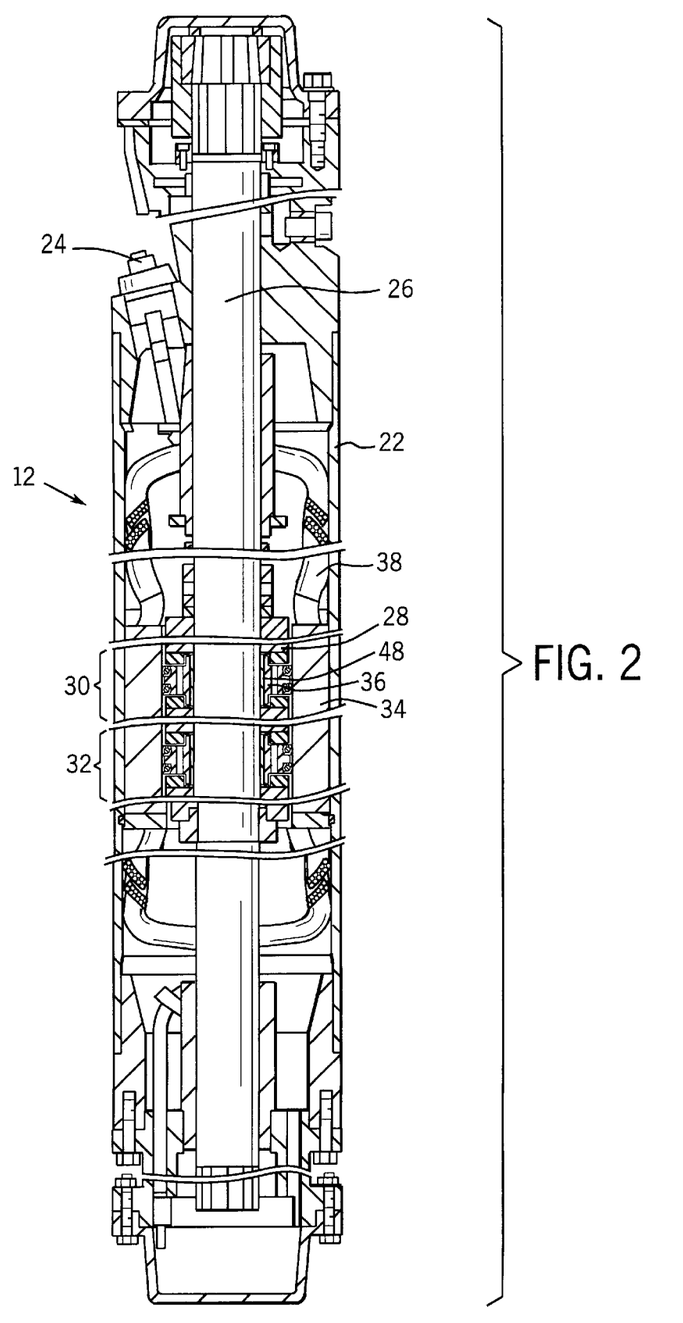
FIG. 2 is a vertical cross-section view of a submersible pump motor of the system of FIG. 1 in which a rotating group is maintained centered within the motor stator and housing.

FIG. 2 illustrates a submersible pump motor 12 in accordance with the present invention. The motor is contained within a housing 22 into which an electrical connector 24 penetrates for transmitting power from cable 18 (See FIG. 1). The motor is comprised primarily of a rotating group and a non-rotating group. The rotating group includes a power transmission shaft 26, a rotor, which is made up of multiple rotor sections 28, and multiple sleeves 48. Rotor sections 28 and sleeves 48 are coupled to shaft 26 such as via a conventional key and keyway structure.

The non-rotating group includes a stator 34 and journals 36. Stator 34 is constructed of metal laminations (not shown). Stator 34 is configured with slots running axially through the stator body (also not shown) through which windings 38 run in a conventional manner. Each journal 36 is disposed circumferentially about a sleeve 48 and is positioned between stator 34 and the respective sleeve 48. Segments 30 and 32 illustrate two self-centering rotor bearing assemblies of the present invention of which journals 36 are a part. Rotor sections 28 lie immediately adjacent above and below each journal 36.

Figure 3:
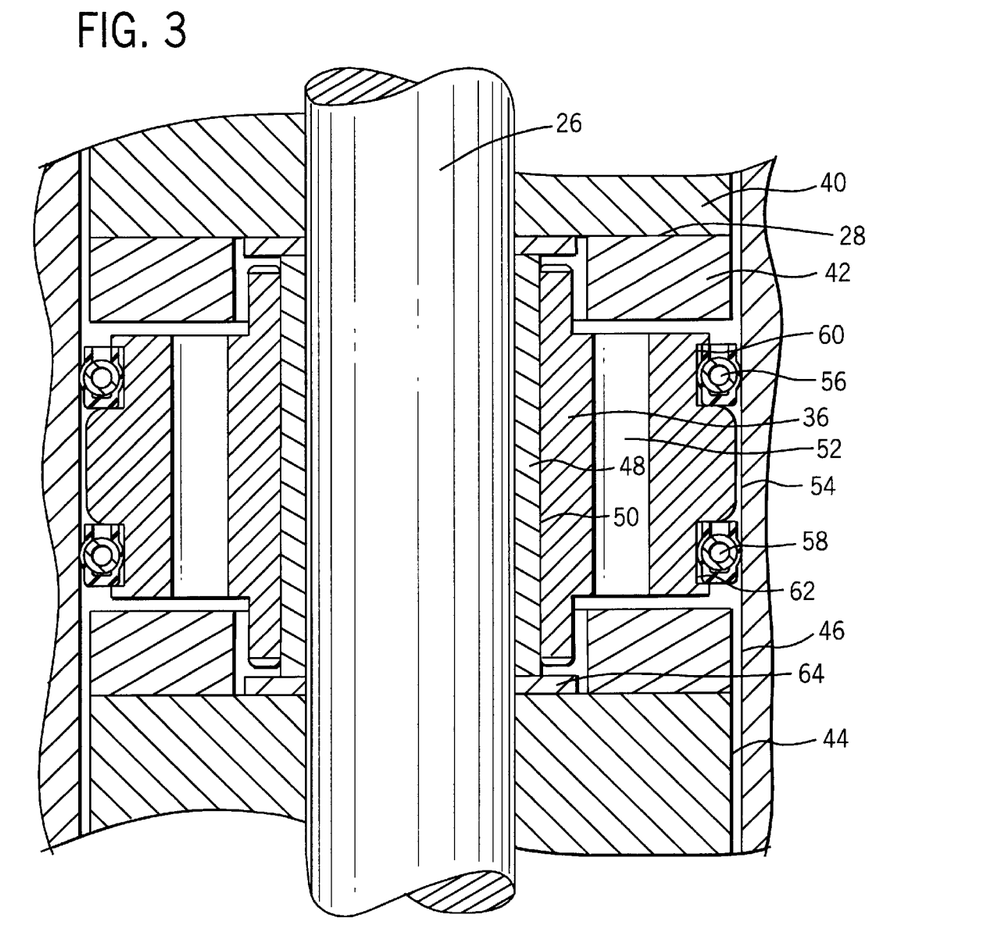
FIG. 3 is an enlarged vertical cross-section view of a preferred embodiment of the self-centering rotor bearing assembly for use in the motor of FIG. 2.

FIG. 3 illustrates an enlarged view of a portion of a self-centering rotor bearing assembly as exemplified in FIG. 2 at 30 and 32. Each rotor section 28 includes a laminated rotor core 40 and a copper end ring 42. Each rotor section 28 has an outer wall 44 which is spaced apart from the inner wall 46 of stator 34. Clearance between rotor wall 44 and stator wall 46 is typically from about 0.018" to about 0.0215". Sleeve 48 is preferably made of bronze or brass and is keyed to power transmission shaft 26.

Rotor sections 28, while rotatively coupled to shaft 26, are not individually axially coupled to shaft 26. The lowermost rotor section at the end of shaft 26 is, however, axially locked to the shaft in order to support the other rotor sections. Sleeves 48, while rotatively coupled to shaft 26 are likewise not axially locked to shaft 26. Thus, the rotor sections 28 and the sleeves 48 have a certain amount of freedom to move in an axial direction, i.e., either upwards or downwards due to relative thermal expansion and contraction. The upper edge or circular rim of sleeve 48 contacts an upper thrust washer 64 which is immediately adjacent to the lowermost lamination of upper rotor section 28. The lower edge of sleeve 48 contacts a lower thrust washer 64 which is immediately adjacent to the uppermost lamination of the lower rotor section 28. The thrust washers 64 are constructed of a phenolic laminate. Thus, each sleeve 48 supports the weight of the rotor section 28 immediately above it and transmits any force from that rotor section to the rotor section 28 immediately below.

The non-rotating group of motor 12 includes stator 34 and journals 36. Each journal 36 is disposed circumferentially about a sleeve 48. Thus, where sleeve 48 and journal 36 abut one another is a rotating interface 50. Multiple axially disposed cylindrical passageways 52 through journal 36 provide for oil flow through journal 36 in order that the oil filling the motor can communicate with adjacent rotor sections for cooling and lubrication. Journal 36 is preferably metal and most preferably of a nitrated steel having a Rockwell C hardness of about 60.

Journal 36 extends radially outward from sleeve 48 to a peripheral surface 54. Peripheral surface 54 is slightly spaced apart from the inner surface 46 of stator 34. Clearance between these components is preferably from about 0.005" to about 0.009". Thus, there is no metal-to-metal contact between journal 36 and stator 34.

The outer peripheral surface of journal 36 presents a pair of annular support regions 60 and 62. Seals 56 and 58 are positioned within circumferential support regions 60 and 62 and frictionally engage inner surface 46 of stator 34. Circumferential support regions 60 and 62 are preferably spaced apart from one another. In a preferred embodiment of the invention, circumferential support region 60 is disposed adjacent the upper surface of journal 36 and region 62 is disposed adjacent the lower surface. This spacing of the circumferential support regions, and thus the seals, provides improved resistance to angular misalignment of the shaft. While the number of circumferential support regions, and thus seals, is not critical, at least two are particularly preferred. In a preferred embodiment of the invention, circumferential support regions 60 and 62 are configured as grooves.

Figure 4:
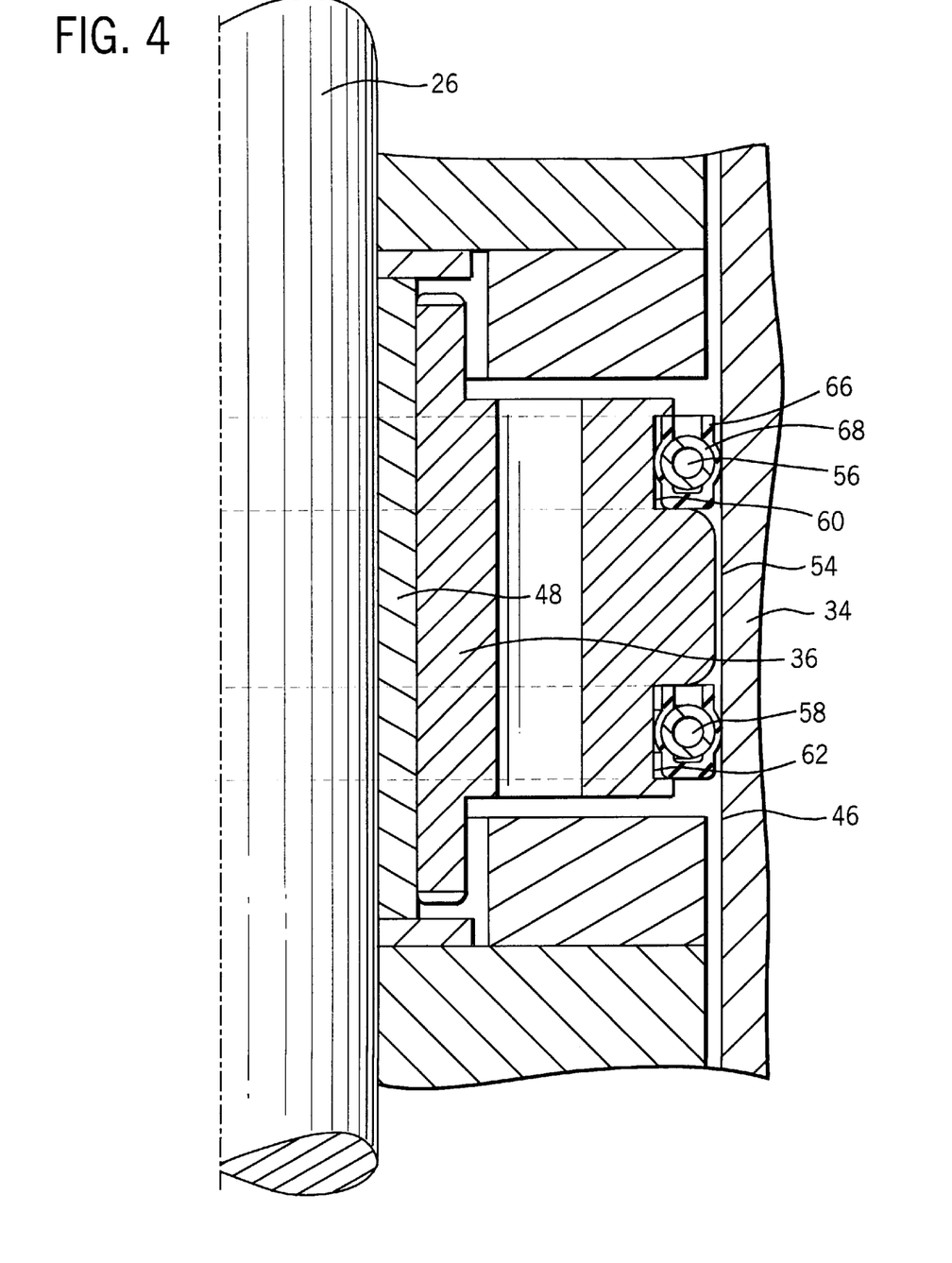
FIG. 4 is an enlarged vertical hemi-section of a preferred embodiment of a self-centering rotor bearing assembly of FIG. 3.

Referring to FIG. 4, peripheral surface 54 of journal 36 has two support grooves extending circumferentially around peripheral surface 54. A first groove 60, is located adjacent to the upper end of journal 36 and the second groove 62 is located adjacent to the lower surface of journal 36. Grooves 60 and 62 are configured in this preferred embodiment to be generally rectangular in cross-section. Groove 60 is open towards inner surface 46 of stator 34 and has a lip rather than a full lateral wall in the portion of the groove nearest the upper surface of journal 36. Likewise, groove 62 is open towards inner surface 46 of stator 34 and has a lip rather than a full lateral wall in the portion of the groove nearest the lower surface of journal 36. Grooves 60 and 62 are dimensioned to accommodate seals 56 and 58.

Seals 56 and 58 each include an interface member 66 and an activating member 68. Interface member 66 is preferably a synthetic polymer and most preferably polytetrafluoroethylene (PTFE) or a mixture of PTFE and other materials, e.g., graphite, brass, and the like. Interface member 66 is generally constructed to have a substantially U-shaped cross-section. Thus, as seen in FIG. 4, interface member 66 generally possesses two parallel side panels connected by a transverse bridge of material. Activating member 68 is disposed within interface member 66 positioned between the parallel lateral panels of interface member 66.

Figure 5:
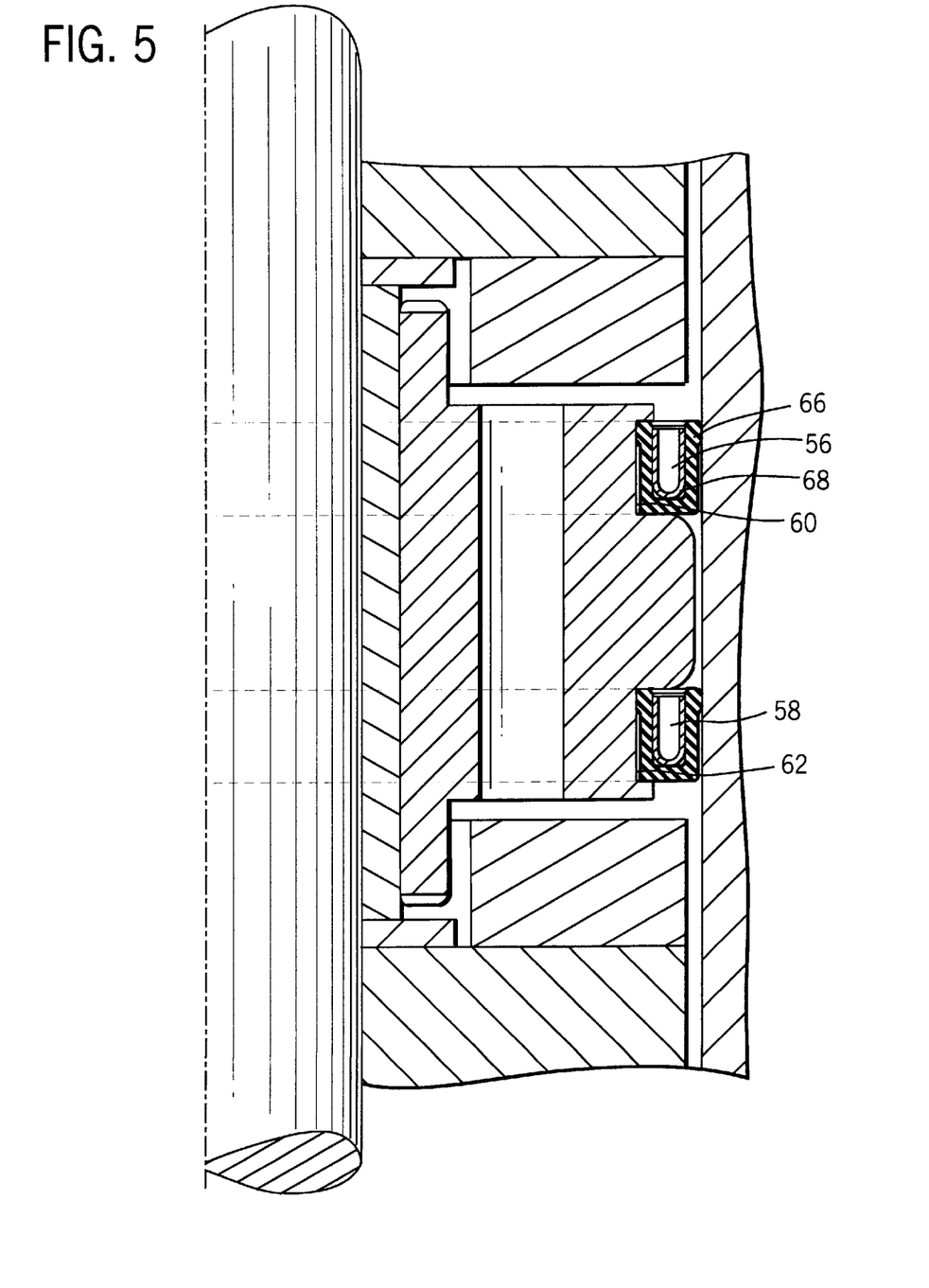
FIG. 5 is an enlarged vertical hemi-section of an alternative embodiment of a self-centering rotor bearing assembly of the present invention.

Activating member 68 is preferably a resilient metal. In a preferred embodiment illustrated in FIG. 4, interface member 66 is PTFE and activating member 68 is a coil spring. The seal illustrated in FIG. 4 is commercially available from Furon Corp. of Los Alamitos, Calif. sold under the commercial designation "Omniseal."In an alternative embodiment of the invention illustrated in FIG. 5, both interface member 66 and activating member 68 have substantially U-shaped cross-sections. Seals 56 and 58 illustrated in FIG. 5 are likewise commercially available from Furon Corp. of Los Alamitos, Calif. also under the commercial designation "Omniseal." Interface member 66 is PTFE and activating member 68 is resilient metal.

Preferably, the seals of the present invention are multi-component seals. That is, they include an interface member which engages both the circumferential support region of the journal and the inner surface of the stator, and at least one other member which activates or energizes the interface member so as to increase its resistance to deforming pressure.

Various cross-sectional configurations of the seal may be employed in the foregoing structure. Indeed, while the seals exemplified herein exhibit an open end, a multi-component seal having some other cross-sectional configuration could be acceptable for the purposes of this invention. For example, a seal having a generally rectangular cross-section or having a generally oval cross-section, if properly activated by another component, could perform acceptably. Nonetheless, seals having cross-sectional configurations similar to those exemplified herein are available commercially. Seals contemplated for use in the present invention are numerous. Other suitable seals include "C-seals" or "U-seals" and are marketed under a variety of commercial designations.

As illustrated in FIG. 4, preferably the seals, as exemplified by seals 56 and 58, are oriented within its respective circumferential support region with the open end of each seal oriented towards the end of motor 12 through which journals 36 are inserted. This orientation facilitates assembly of the motor. Generally, a submersible pump motor is assembled one rotor section at a time. That is, the lowest rotor section is placed first, followed by a rotor bearing assembly, followed by the next rotor section above the installed rotor bearing assembly, and so on. When the appropriate number of rotor sections have been assembled for the desired motor configuration, the shaft, rotor sections, and rotor bearing assemblies are inserted into the cylindrical space inside of the stator.

Because each rotor bearing assembly frictionally engages the inner surface of stator 46 at the interface member of seals 56 and 58, this preferred orientation of each seal facilitates that insertion. During insertion, seals 56 and 58 are resiliently compressed. Accordingly, as illustrated in FIGS. 2–5, when motor 12 is assembled from the upper end of housing 22, the preferred orientation for the seals is with the open end of each seal oriented towards the upper end of the motor.

The rotor bearing assembly of the present invention eases the assembly of a submersible pump motor. Additionally, it imparts a centering force on the shaft and combats angular misalignment of the shaft, thus dampening vibration. Moreover, it frictionally engages the inner surface of the stator to prevent rotation of the journal while avoiding metal-to-metal contact between the rotating and non-rotating components, or between metal centering elements and the motor components. These benefits lead to longer life expectancy of the motor and the pumping system.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A submersible pumping system comprising:
    a pump;
    a motor drivingly coupled to the pump, the motor including a rotating assembly and a non-rotating assembly, the non-rotating assembly including a self-centering rotor bearing assembly, the rotor bearing assembly including a journal configured to be disposed about a rotating member of the rotating assembly, the journal having a peripheral surface, the surface being configured to possess at least two circumferential support regions, the support regions being spaced apart from one another, and at least two seals, each seal including an interface member and an activating member, each seal being disposed in a corresponding support region and being configured to exert a force against the journal and against a non-rotating member of the non-rotating assembly disposed about the periphery of the journal; and
    a motor protector for separating an interior region of the motor from surrounding fluids.

2. The submersible pumping system of claim 1, wherein the pump is a centrifugal pump.

3. The submersible pumping system of claim 1, wherein the rotating assembly includes a rotating power transmission shaft; a sleeve coupled to the shaft; and a rotor coupled to the shaft.

4. The submersible pumping system of claim 1, wherein the non-rotating assembly includes a stator.

5. The submersible pumping system of claim 1, wherein the circumferential support regions in the peripheral surface of the journal are configured as grooves.

6. The submersible pumping system of claim 1, wherein the peripheral surface of the journal is configured to have a first end possessing a circumferential support region and a second end possessing a circumferential support region.

7. The submersible pumping system of claim 1, wherein the interface member has a substantially U-shaped cross-section and wherein the activating member is disposed within the interface member and has a substantially U-shaped cross-section.

8. The submersible pumping system of claim 7, wherein the interface member is a synthetic polymer and the activating member is a resilient metal.

9. The submersible pumping system of claim 8, wherein the interface member is poly-tetrafluoroethylene.

10. The submersible pumping system of claim 1, wherein the interface member has a substantially U-shaped cross-section and wherein the activating member is disposed within the interface member and has a substantially circular cross-section.

11. The submersible pumping system of claim 10, wherein the interface member is a synthetic polymer and the activating member is a resilient metal.

12. The submersible pumping system of claim 11, wherein the interface member is poly-tetrafluoroethylene and the activating member is a coil spring.

13. A submersible pump motor comprising:
    a rotating assembly having a rotating member; and
    a non-rotating assembly, the non-rotating assembly including a self-centering rotor bearing assembly, the rotor bearing assembly including a journal configured to be disposed about the rotating member, the journal having a peripheral surface configured to possess at least two circumferential support regions, the support regions being spaced apart from one another, and at least two seals, each seal including an interface member and an activating member, each seal being disposed in a corresponding support region and being configured to exert a force against the journal and against a non-rotating member of the non-rotating assembly disposed about the periphery of the journal.

14. The submersible pump motor of claim 13, wherein the rotating assembly includes a rotating power transmission shaft; a sleeve coupled to the shaft; and a rotor coupled to the shaft.

15. The submersible pump motor of claim 13, wherein the non-rotating assembly includes a stator.

16. The submersible pump motor of claim 13, wherein the circumferential support regions in the peripheral surface of the journal are grooves.

17. The submersible pump motor of claim 13, wherein the peripheral surface of the journal has a first end possessing a circumferential support region and a second end possessing a circumferential support region.

18. The submersible pump motor of claim 13, wherein the interface member has a substantially U-shaped cross-section and wherein the activating member is being disposed within the interface member and has a substantially U-shaped cross-section.

19. The submersible pump motor of claim 18, wherein the interface member is a synthetic polymer and the activating member is a resilient metal.

20. The submersible pump motor of claim 19, wherein the interface member is poly-tetrafluoroethylene.

21. The submersible pump motor of claim 13, wherein the interface member has a substantially U-shaped cross-section and wherein the activating member is disposed within the interface member and has a substantially circular cross-section.

22. The submersible pump motor of claim 21, wherein the interface member is a synthetic polymer and the activating member is a resilient metal.

23. The submersible pump motor of claim 22, wherein the interface member is poly-tetrafluoroethylene and the activating member is a coil spring.

24. A self-centering rotor bearing assembly for use in a submersible pump motor comprising:
- a journal being configured to be disposed about a rotating member of the motor, the journal having a peripheral surface, the surface being configured to possess at least two circumferential support regions, the support regions being spaced apart from one another; and
- at least two seals, each seal including an interface member and an activating member, each seal being disposed in a corresponding support region and being configured to exert a force against the journal and against a non-rotating member of the motor disposed about the periphery of the journal.

25. The self-centering rotor bearing assembly of claim 24, wherein the rotating member of the motor is a sleeve coupled to a rotating power transmission shaft.

26. The self-centering rotor bearing assembly of claim 24, wherein the circumferential support regions in the peripheral surface of the journal are configured as grooves.

27. The self-centering rotor bearing assembly of claim 24, wherein the peripheral surface of the journal is configured to have a first end possessing a circumferential support region and a second end possessing a circumferential support region.

28. The self-centering rotor bearing assembly of claim 24, wherein the interface member has a substantially U-shaped cross-section and wherein the activating member is disposed within the interface member and has a substantially U-shaped cross-section.

29. The self-centering rotor bearing assembly of claim 28, wherein the interface member is a synthetic polymer and the activating member is a resilient metal.

30. The self-centering rotor bearing assembly of claim 29, wherein the interface member is polytetrafluoroethylene.

31. The self-centering rotor bearing assembly of claim 24, wherein the non-rotating member of the motor is a stator.

32. The self-centering rotor bearing assembly of claim 24, wherein the interface member has a substantially U-shaped cross-section and wherein the activating member is disposed within the interface member and has a substantially circular cross-section.

33. The self-centering rotor bearing assembly of claim 32, wherein the interface member is a synthetic polymer and the activating member is a resilient metal.

34. The self-centering rotor bearing assembly of claim 33, wherein the interface member is polytetrafluoroethylene and wherein the activating member is a coiled spring.

* * * * *